(No Model.)
M. B. MONROE.
VEHICLE BRAKE.
No. 510,699.
Patented Dec. 12, 1893.
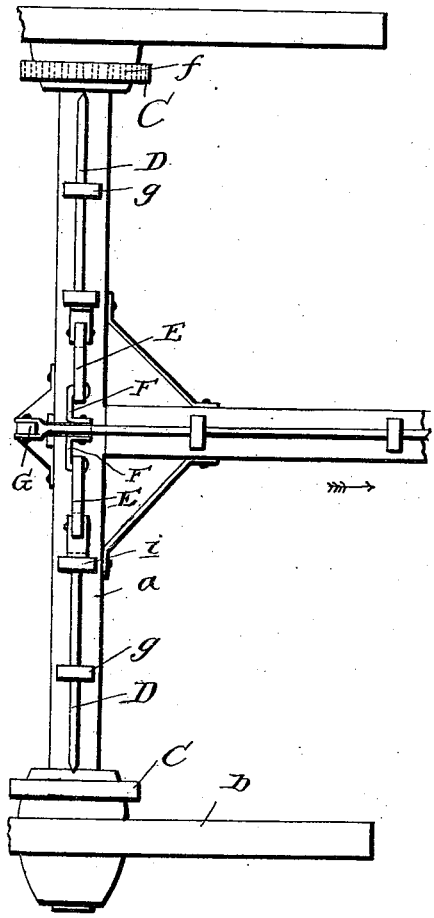
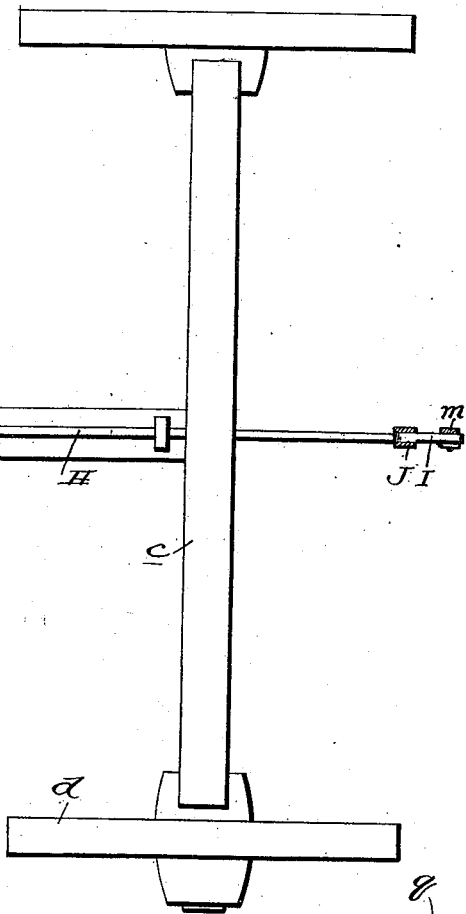
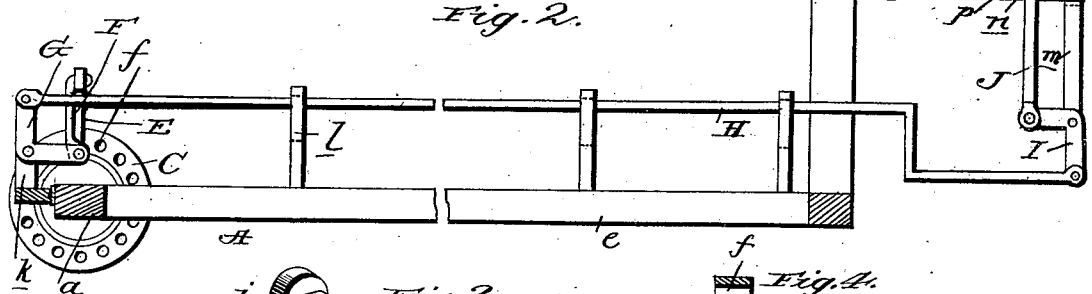
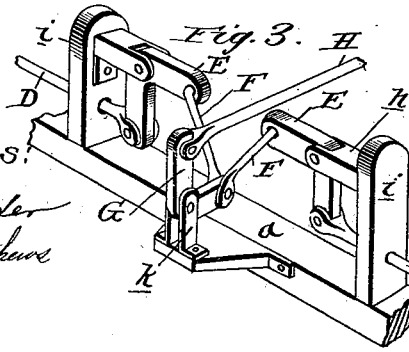
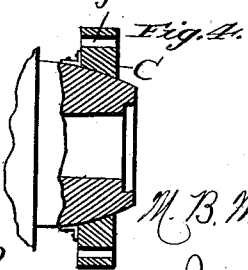
Witnesses:
Inventor
M. B. Monroe
By James J. Sheehy
Attorney

UNITED STATES PATENT OFFICE.

MARION BAKER MONROE, OF NEW ORLEANS, LOUISIANA.

VEHICLE-BRAKE.

SPECIFICATION forming part of Letters Patent No. 510,699, dated December 12, 1893.

Application filed October 5, 1893. Serial No. 487,283. (No model.)

*To all whom it may concern:*

Be it known that I, MARION BAKER MONROE, a citizen of the United States, residing at New Orleans, in the parish of Orleans and State of Louisiana, have invented certain new and useful Improvements in Vehicle-Brakes; and I do declare the following to be a full, clear, and exact description of the invention, such as will enable others skilled in the art to which it appertains to make and use the same.

My invention relates to improvements in vehicle brakes; and it has for its general object to provide a cheap, simple, and efficient brake mechanism through the medium of which a person may quickly and conveniently lock the wheels of a vehicle in leaving the same, so as to render the tying of the draft animal or animals unnecessary.

With the foregoing end in view the invention will be fully understood from the following description and claims when taken in connection with the annexed drawings, in which—

Figure 1, is a plan view of a vehicle running gear with my improved mechanism applied. Fig. 2, is a detail, vertical, longitudinal section of the same together with a portion of the vehicle body. Fig. 3, is an enlarged perspective view of a portion of the mechanism, and Fig. 4, is a detail, enlarged, diametrical section taken through the hub of one of the hind wheels.

Referring by letter to said drawings:—A, indicates the running gear of a vehicle, which is of the ordinary construction and comprises the rear axle $a$, carrying wheels $b$, the front axle $c$, carrying wheels $d$, and the coupling pole $e$, connecting the front and rear axles; and B, indicates the body which may be mounted upon and connected to the running gear in any approved manner.

C, indicates rings or collars which are mounted upon the inner portion of the hubs of the rear wheels $b$, and are fixed thereto in any suitable manner. These rings or collars C, are provided with a circular series of transverse apertures $f$, and these transverse apertures are designed to receive the reciprocatory and pointed rods D, which are mounted in bearings $g$, on the rear axle and serve in conjunction with the collars C, to lock the wheels, as will be presently described. The inner ends of the rods D, are preferably bifurcated as better shown in Fig. 3, and are pivotally connected to the lower, outer ends of bell-crank levers E, which are fulcrumed in brackets $h$, connected to standards $i$, rising from the rear axle as shown. These levers E, have their opposite ends connected to links F, and said links are connected in turn to one end of a bell-crank lever G, which is preferably arranged in rear of the levers E, and is disposed at right angles to the same, as illustrated.

As better shown in Fig. 3 of the drawings, the lever G, is fulcrumed in standards $k$, rising from the rear axle or from a block connected thereto, and it has its upper end connected to a rod H, which is bent as shown and is designed to slide in suitable bearings $l$, upon the coupling pole $e$. By this manner of connecting the slidable rod H, it will be seen that when said rod is moved forwardly or in the direction indicated by arrow, the several bell-crank levers will be caused to rock on their bearings and the rods D, will be thrown outwardly so as to enter the apertures $f$, of the collars C, and securely lock the wheels against rotation. It will also be seen that when the rod H, is moved in a direction opposite to that indicated, the rods D, will be drawn inwardly from the collars C, and the wheels will be free to turn.

In order to enable a person to quickly and conveniently lock the wheels of the vehicle and as quickly release the same, I have provided the mechanism better illustrated in Fig. 2. This mechanism comprises a bell-crank lever I, which is fulcrumed on a hanger $m$, depending from the body B, and has one of its ends connected to the rod H, a headed pedal rod or plunger J, which takes through an opening $n$, in the body B, and a spring K, which surrounds the rod J, above the body and is designed to return said rod to its normal position when released as will be presently described. The pedal rod J, is pivotally connected to one end of the lever I, as shown, and it is provided with rack teeth $p$, designed to engage a plate $q$, which is connected to the body and preferably has its engaging edge beveled as shown. Thus it will be seen that the driver, before leaving the vehicle may with his foot depress the rod J, and push it forward so that its teeth will engage the plate $q$, when the rod will be locked in its depressed position and the wheels will be fixed against rotation. When the driver returns to his vehicle and desires to take off the brakes, it is simply necessary for him to move the rod J, out of engagement with the plate $q$, when the spring K, will return said rod to its normal position and thereby draw the rods D, out of engagement with the collars or rings C.

It will be readily seen from the foregoing that when the rods D, are in engagement with the collars C, the wheels are securely locked and the driver may safely leave his vehicle without the necesssity of tying the draft animal, which is a desideratum. It will also be seen that the mechanism for effecting the locking of the wheels is very simple and durable, and that it does not add materially to the weight of the vehicle nor detract from the beauty thereof.

Having described my invention, what I claim is—

1. In a vehicle brake, substantially as described, the combination with a running gear comprising front and rear axles carrying traveling wheels and a coupling pole connecting said axles and a collar fixed on the hub of one of the rear wheels and having transverse apertures arranged in a circular series; of a reciprocatory rod D, arranged in bearings on the rear axle and having its outer end pointed, a bell crank lever E, connected to the inner end of the rod D, a bell crank lever G, disposed at right angles to the lever E, a link connecting said levers E, and G, a slidable rod H, arranged in bearings on the coupling pole and connected to the bell-crank lever G, and a suitable means for operating the rod H, all substantially as and for the purpose set forth.

2. The combination with a vehicle having a body, and a running gear comprising front and rear axles carrying wheels and a coupling pole connecting said axles; of the rings or collars fixed on the hubs of the rear wheels and having transverse apertures arranged in circular series, the reciprocatory rods D, arranged in bearings on the rear axle and having their outer ends pointed, bell crank levers E, connected to the inner ends of the rods D, the bell crank lever G, disposed at right angles to the levers E, links connecting the levers E, and the lever G, the slidable rod H, arranged in bearings on the coupling pole and connected to the lever G, a bell crank lever I, connected to the forward end of the slide rod H, the toothed and headed rod J, pivotally connected to the lever I, and extending upwardly through the floor of the body and adapted to engage a fixed plate as $q$, and a spring surrounding the rod J, and adapted to return the same to its normal position, all substantially as and for the purpose set forth.

In testimony whereof I affix my signature in presence of two witnesses.

MARION BAKER MONROE.

Witnesses:
GEO. W. SADLER,
R. G. HARRIS.